United States Patent

[11] 3,602,347

| [72] | Inventors | Hirozi Yamaguchi;<br>Koichiro Hirozawa, both of Kariya-shi, Japan |
|---|---|---|
| [21] | Appl. No. | 769,185 |
| [22] | Filed | Oct. 21, 1968 |
| [45] | Patented | Aug. 31, 1971 |
| [73] | Assignee | Aishin Seiki Kabushiki Kaisha<br>Kariya-shi, Aichi-Ken, Japan |
| [32] | Priority | Oct. 21, 1967 |
| [33] | | Japan |
| [31] | | 42/89550 |

[54] CLUTCH ENGAGING MOTOR WITH AUTOMATIC EXHAUST VALVE
5 Claims, 4 Drawing Figs.

[52] U.S. Cl. ...................................................... 192/106 F,
91/404, 192/85 AA
[51] Int. Cl. ....................................................... F16d 25/00
[50] Field of Search ............................................ 192/106 F,
85, 85 A, 85 AA, 87.15; 91/404

[56] References Cited
UNITED STATES PATENTS

| 2,960,202 | 11/1960 | Stevens et al. | 192/106 F X |
| 2,122,067 | 6/1938 | Kress | 192/106 F UX |
| 2,795,309 | 6/1957 | Hasbany | 192/106 F X |
| 3,301,142 | 1/1967 | Cenko | 192/106 F X |
| 3,362,481 | 1/1968 | Steinhagen | 192/106 F X |
| 3,296,941 | 1/1967 | Rochte | 91/404 |
| 3,417,739 | 12/1968 | Fryer | 91/404 X |

*Primary Examiner*—Benjamin W. Wyche
*Attorney*—Holman & Stern

ABSTRACT: In a hydraulically actuated clutch having a clutch drum and a hydraulic piston slidably operating in the drum and forming therewith a hydraulic fluid chamber, a check valve which is always actuated by the action of the piston returning to clutch release position to open a fluid passageway and thereby discharge residual fluid from the fluid chamber. Clutch dragging caused by pressure due to centrifugal force acting on residual fluid is thus prevented.

INVENTORS
H. YAMAGUCHI
K. HIROZAWA
BY
ATTORNEYS

INVENTORS
H. Yamaguchi
K. Hirozawa 3,602,347

CLUTCH ENGAGING MOTOR WITH AUTOMATIC EXHAUST VALVE

BACKGROUND OF THE INVENTION

This invention relates generally to hydraulic (fluid pressure) mechanisms and systems, and more particularly to a new and improved check valve device in a hydraulically actuated clutch (hereinafter referred to as a "hydraulic clutch"), by which device, the clutch operation is rendered positive and consistently reliable.

A check valve of a hydraulic clutch operates to discharge hydraulic fluid remaining in the piston hydraulic fluid chamber of the clutch at the time of release thereof, thereby preventing generation of pressure due to centrifugal force acting on the residual fluid in the hydraulic chamber and preventing dragging of the clutch due to the resulting piston movement.

Check valves of hydraulic clutches known heretofore have been of the check ball or leaf spring type. With a check valve of either of these types, however, when the quantity of fluid remaining in the piston hydraulic chamber at the time of clutch release is large, there is a possibility of the check valve being closed since a large quantity of the fluid flows past the check valve, whereby the pressure of the residual fluid is caused to rise by centrifugal force due to the rotation of the clutch drum, and the clutch piston is thereby pushed to cause clutch dragging.

SUMMARY OF THE INVENTION

It is an object of the present invention to overcome the above-described difficulty in known hydraulic clutches by providing an improved check valve device in a hydraulic clutch which device always opens the fluid discharge passageway whenever the clutch hydraulic piston returns to its clutch-release position.

Another object of the invention is to provide a check valve device of the above type which has a simple and inexpensive construction and a consistently reliable operation.

According to the present invention, briefly summarized, there is provided, in a hydraulic clutch mechanism having a clutch drum and a hydraulic piston slidably disposed in the clutch drum and having a head wall member forming with an inner wall member of the clutch drum a hydraulic fluid chamber therebetween, friction clutch means, and spring means urging the piston to return toward its clutch-release position, said piston being adapted to engage with the friction clutch means against said spring means when hydraulic pressure is applied thereto, and being disengaged therefrom when hydraulic pressure is released therefrom by means of return spring means, the combination therewith of a check valve device disposed in one of said members at an outer part thereof with respect to the rotational axis of the clutch drum and comprising, a passageway including a check valve seat for discharging hydraulic fluid unidirectionally out of said chamber, another spring means, and a check valve biased by said another spring means toward said valve seat and adapted to sealingly engage said valve seat, thereby interrupting the fluid flow through said passageway when said piston is engaged with and adapted to abut against one of said members, said check valve having a projection protruding into said chamber when the check valve is seated and adapted to abut against one of said wall members and be actuated thereby to open the passageway whenever said piston returns to its release position at which said head wall member closely approaches said inner wall member.

The nature, principle, details, and utility of the invention will be more clearly apparent from the following detailed description with respect to an example of preferred embodiment of the invention, when read in conjunction with the accompanying drawing, in which like parts are designated by like reference numerals.

DETAILED DESCRIPTION

Figure 1:
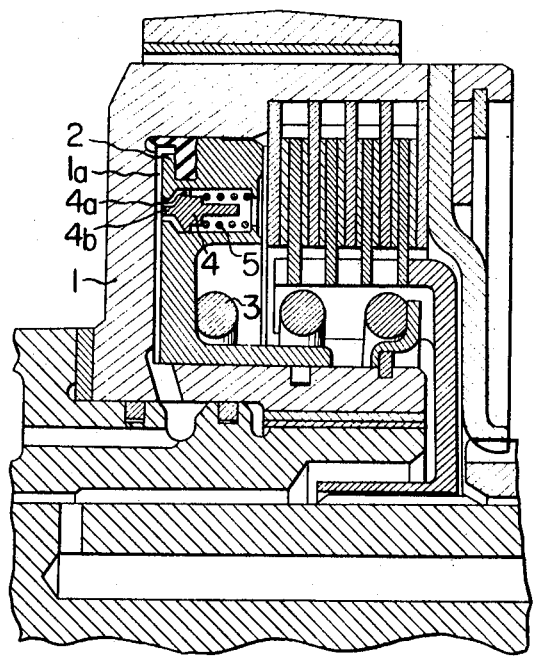
FIG. 1 is a fragmentary side elevation, in longitudinal section, showing the essential parts of a hydraulic clutch provided with an example of a check valve device according to the invention.

The essential parts of the hydraulic clutch shown in FIG. 1 are a clutch drum 1, a hydraulic piston 2, and a return spring 3 for returning the piston 2 to its clutch-release position. A piston hydraulic fluid chamber 1a is formed between the working head of the piston 2 and the inner end wall part of the clutch drum 1.

The piston 2 has in its radially outer part two cylindrical holes 2a and 2b of different diameter contiguously and coaxially aligned in the rotational axis direction of the clutch drum 1. The hole 2b is of smaller diameter than the hole 2a and, at its end remote from hole 2a, communicates with the piston hydraulic fluid chamber 1a. The two holes 2a and 2b communicate with each other at a conical shoulder constituting a valve seat 2c for receiving and operating cooperatively with a check valve 4 disposed in the hole 2a and biased toward the valve seat 2c by a compression spring 5. The end of the spring 5 remote from the check valve 4 is in abutted contact with a spring retaining means 2d.

The check valve 4 is provided at its end nearer the hydraulic chamber 1a with a coaxially projecting pin 4b of a diameter substantially less than that of the hole 2b. The outer end of the pin 4b protrudes into the hydraulic chamber 1a, extending out of the hole 2b beyond the outer rim thereof, when the check valve 4 is seated against the valve seat 2c.

The present check valve device of the above-described organization operates in the following manner. When the hydraulic fluid within the piston hydraulic chamber 1a is discharged to release the clutch, and the hydraulic piston 2 is returned by the return spring 3 toward its clutch-release position (toward the left as viewed in the drawing), the outer tip of the pin 4b contacts and abuts against the end wall of clutch drum 1, and further return of the piston 2 to its clutch-release position causes the valve 4 to separate away from the valve seat 2c.

When the valve 4 thus separates away from the valve seat 2c, residual hydraulic fluid within piston the hydraulic fluid chamber 1a is discharged through the hole 2b, the gap between the valve 4 and the wall of hole 2a, and through at least one groove 4a formed in the peripheral part of the valve 4.

Thus, the check valve always opens whenever the hydraulic piston of the clutch returns to its clutch release position to exhaust the hydraulic fluid remaining within the piston hydraulic chamber.

The relationship between the working hydraulic pressure, the cross-sectional area of the hole 2b, and the spring constant of the spring 5 must, of course, be considered so as to prevent opening of the valve 4 due to the working hydraulic pressure when this pressure is introduced into the hydraulic chamber 1a.

Figure 2:
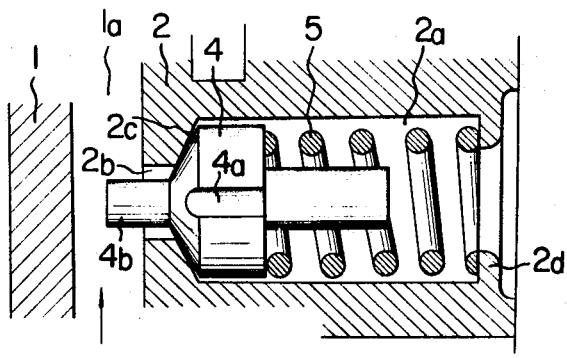
FIG. 2 is a relatively enlarged side elevation, in longitudinal section, showing the details of the check valve device.
Figure 3:
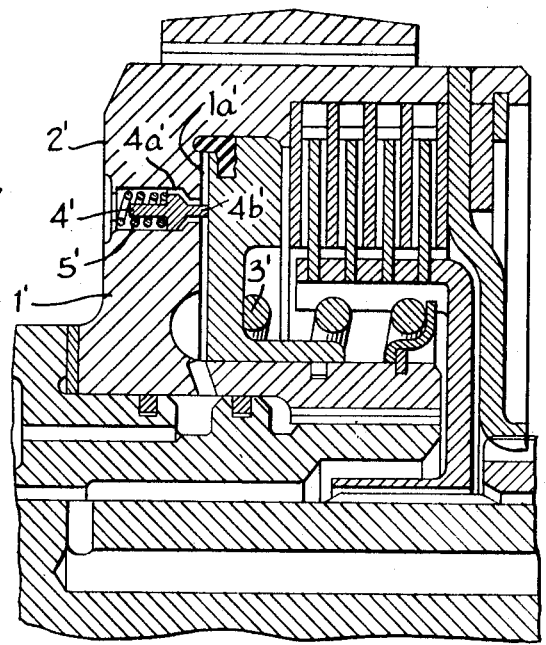
FIG. 3 is a view similar to FIG. 1 illustrating a modified form of the invention.
Figure 4:
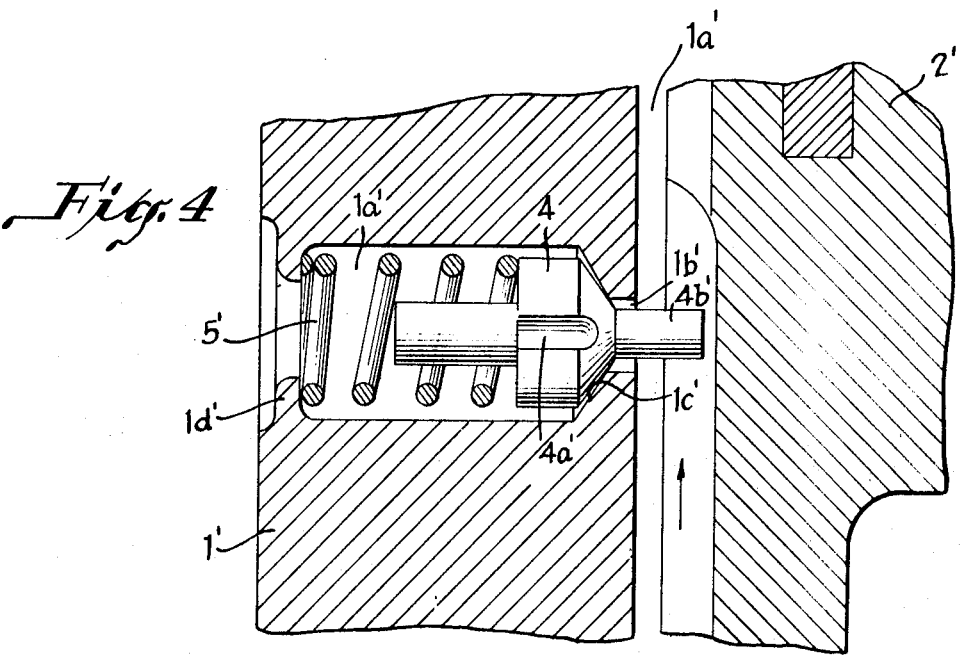
FIG. 4 is a view along the lines of FIG. 2 of the modification shown in FIG. 3.

In FIGS. 3 and 4 is illustrated a modified embodiment in which the components of the hydraulic clutch are similar in structural detail and function to those disclosed in the embodiment of FIGS. 1 and 2 and consequently similar parts will bear the same reference numerals except such reference numerals are primed.

In operation, when the hydraulic fluid within the piston chamber 1a' is discharged to release the clutch, the hydraulic piston 2' is returned by the return spring 3' towards its clutch-release position, the outer tip of the pin 4b' contacts and abuts against the end wall of the piston 2', and further return of the piston 2' to its clutch-release position causes the valve 4' to separate from the valve seat 1c'.

We claim:

1. In a hydraulically actuated clutch mechanism having a clutch drum and a hydraulic piston slidably disposed in said clutch drum and having a head wall member forming with an inner wall member of the clutch drum a hydraulic fluid chamber therebetween, friction clutch means, and spring means urging said piston to return toward its clutch-release position, said piston being adapted to engage with said friction clutch means against said spring means when hydraulic pressure is applied thereto, and being disengaged therefrom when hydraulic pressure is released therefrom by means of the return spring means, the combination therewith of a check valve device disposed in one of said members at an outer part thereof with respect to the rotational axis of the clutch drum and comprising, a passageway including a check valve seat for discharging hydraulic fluid unidirectionally out of said chamber, another spring means, and a check valve biased by said another spring means toward said valve seat and adapted to sealingly engage said valve seat thereby interrupting the fluid flow through said passageway when said piston is in clutch engagement position, said check valve having a projection protruding into said chamber when the check valve is seated and adapted to abut against one of said wall members and be actuated thereby to open the passageway whenever said piston returns to its release position at which said head wall member closely approaches said inner wall member.

2. The combination as claimed in claim 1 in which check valve device is disposed in said head wall member of the hydraulic piston.

3. The combination as claimed in claim 1 in which said check valve device is disposed in said inner wall member of the clutch drum.

4. The combination as claimed in claim 1, in which said passageway comprises a large diameter cylindrical hole in which the check valve is movably disposed, a relatively small diameter cylindrical hole communicatively and coaxially aligned and joined with said large diameter cylinder hole in parallelism to the axis of the clutch drum and communicating with said hydraulic fluid chamber, and a shoulder part constituting the valve seat between said two cylindrical holes, and said projection of the check valve is a pin coaxially projecting from the check valve and having a diameter substantially less than the diameter of the small-diameter cylindrical hole in which it is disposed.

5. The combination as claimed in claim 1 in which at least one groove is formed in the peripheral part of said check valve.